April 30, 1940. R. ANKE Re. 21,436

SELECTIVE THREAD FEEDING MECHANISM FOR KNITTING MACHINES

Original Filed Oct. 27, 1933 7 Sheets-Sheet 1

INVENTOR:
Rudolph Anke,
BY Alfred E. Schlinger
ATTORNEY.

April 30, 1940. R. ANKE Re. 21,436

SELECTIVE THREAD FEEDING MECHANISM FOR KNITTING MACHINES

Original Filed Oct. 27, 1933 7 Sheets-Sheet 2

INVENTOR:
Rudolph Anke,
BY Sylvester E. Schinger,
ATTORNEY.

April 30, 1940. R. ANKE Re. 21,436
SELECTIVE THREAD FEEDING MECHANISM FOR KNITTING MACHINES
Original Filed Oct. 27, 1933 7 Sheets-Sheet 3
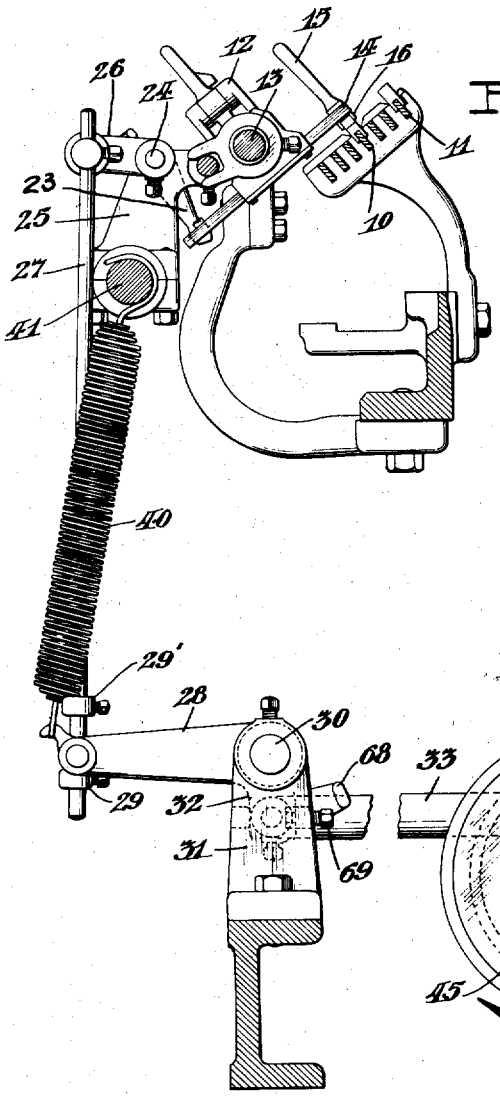
FIG. 3.
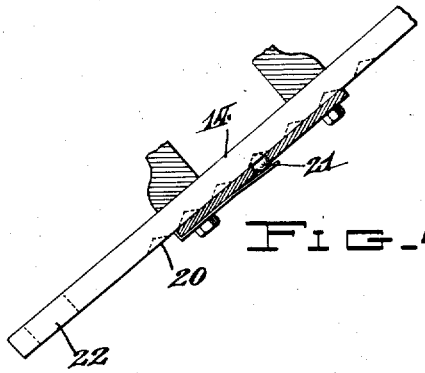
FIG. 4.
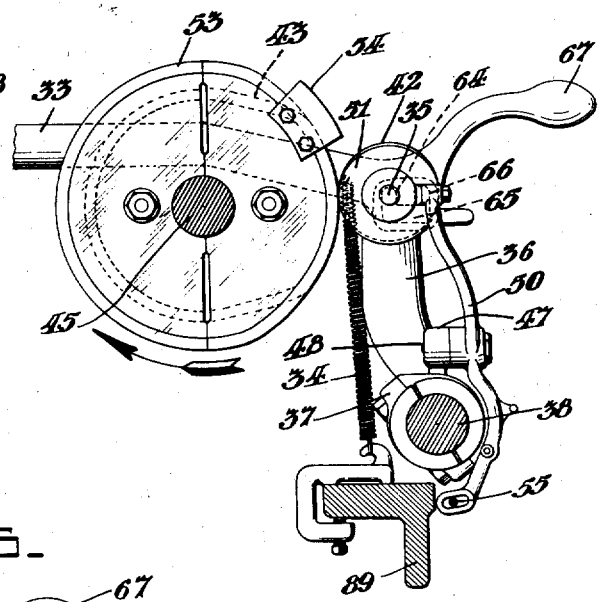
FIG. 5.
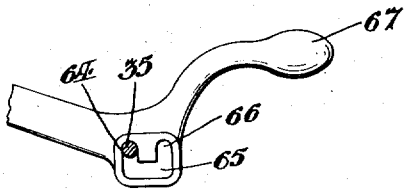
INVENTOR:
Rudolph Anke,
BY Alfred E. Oschinger,
ATTORNEY.

April 30, 1940. R. ANKE Re. 21,436

SELECTIVE THREAD FEEDING MECHANISM FOR KNITTING MACHINES

Original Filed Oct. 27, 1933 7 Sheets-Sheet 4

INVENTOR:
Rudolph Anke,
BY Alfred E. Schlinger
ATTORNEY.

April 30, 1940. R. ANKE Re. 21,436
SELECTIVE THREAD FEEDING MECHANISM FOR KNITTING MACHINES
Original Filed Oct. 27, 1933 7 Sheets-Sheet 5
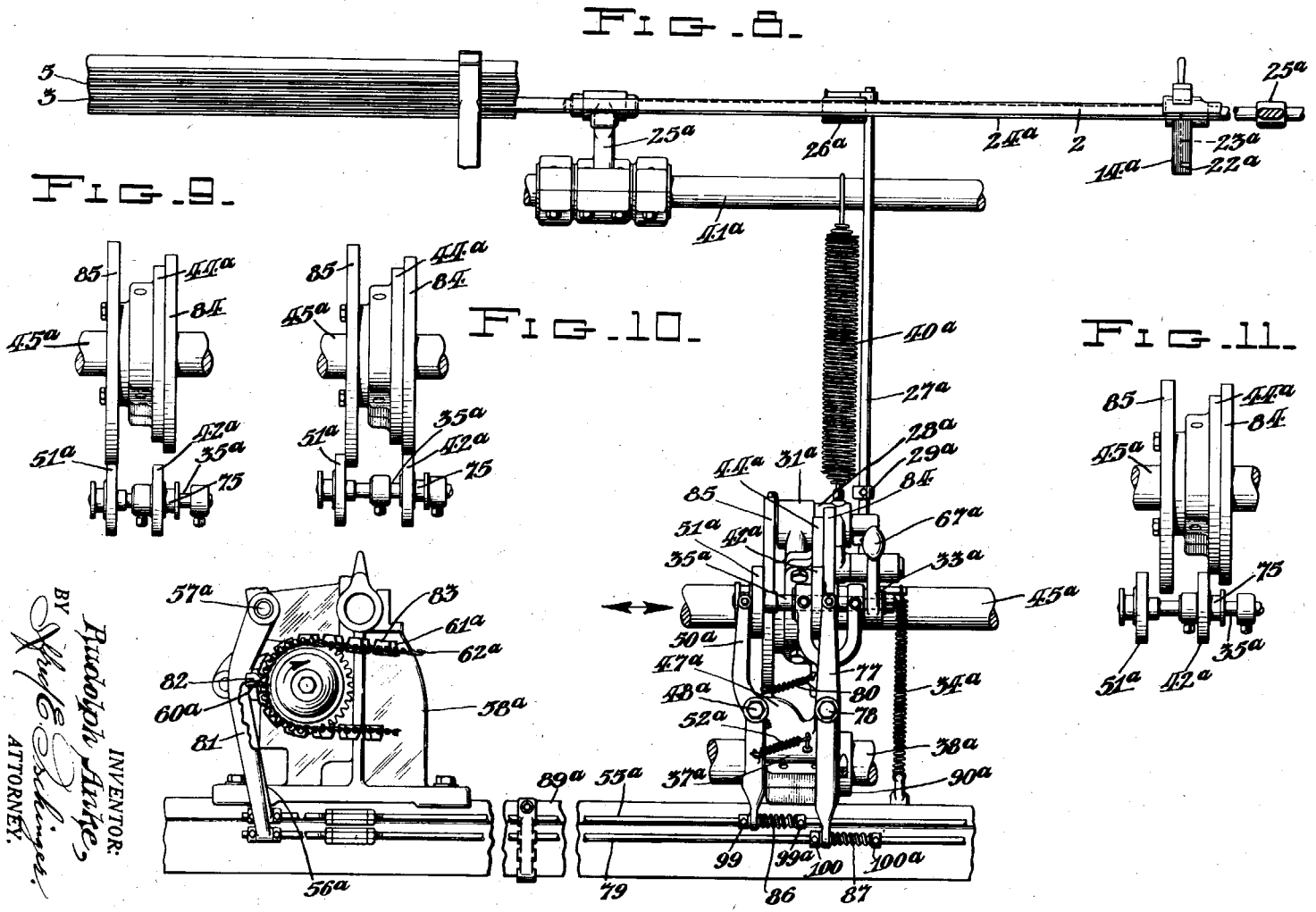
INVENTOR:
Rudolph Anke,
BY Alfred E. Zschinger,
ATTORNEY.

SELECTIVE THREAD FEEDING MECHANISM FOR KNITTING MACHINES
Original Filed Oct. 27, 1933 7 Sheets-Sheet 6
FIG. 12.
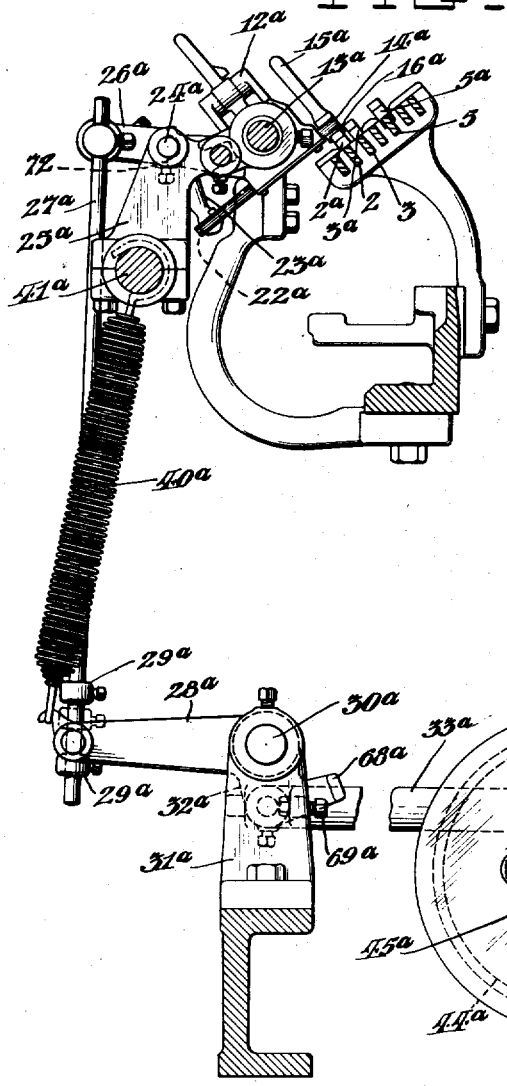
FIG. 13.
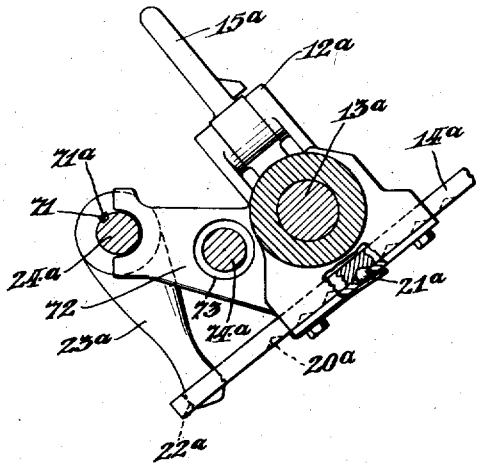
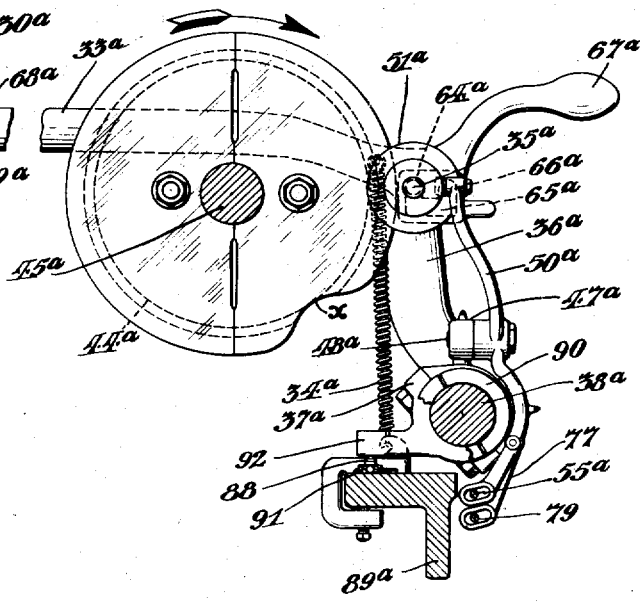
INVENTOR:
Rudolph Anke
BY Alfred E. Schinger,
ATTORNEY.

April 30, 1940. R. ANKE Re. 21,436

SELECTIVE THREAD FEEDING MECHANISM FOR KNITTING MACHINES

Original Filed Oct. 27, 1933 7 Sheets-Sheet 7

INVENTOR:
Rudolph Anke,
BY Alfred E. Tschinger,
ATTORNEY.

Reissued Apr. 30, 1940

Re. 21,436

UNITED STATES PATENT OFFICE 21,436

SELECTIVE THREAD FEEDING MECHANISM FOR KNITTING MACHINES

Rudolph Anke, West Reading, Pa., assignor to Textile Machine Works, Wyomissing, Pa., a corporation of Pennsylvania Original No. 2,142,168, dated January 3, 1939, Serial No. 695,397, October 27, 1933. Application for reissue December 13, 1939, Serial No. 309,058

7 Claims. (Cl. 66—127)

My invention relates to knitting machines, provided with one or more yarn carrier control stations, for selectively actuating in preselected order yarn carriers feeding separate yarns respectively so as to form separate thread loop formations in a knitted fabric during its production; this application being a continuation-in-part of my application Serial No. 566,989 filed October 5, 1931.

One object of my invention is to provide novel mechanism in a knitting machine for automatically connecting with and disconnecting from actuating means, in preselected order, certain yarn carriers which lay the yarn to be knitted, and which carriers are provided with a desired selection of separate yarns of either the same or different color, gauge, or other characteristic dependent upon the separate yarn pattern, or effect, to be attained in the loop formation and resultant knitted fabric.

Another object is to provide a novel attachment for a knitting machine for automatically controlling yarn carriers in the foregoing manner, which attachment is simple in construction and operation, and which does not unduly complicate the knitting machine structure, and which may readily be added to existing installations.

With these objects in view, I have illustrated several embodiments of my invention in connection with a straight knitting machine of the full fashined type, and have provided the usual friction box on the friction rod with a yarn carrier rod engaging, or movement transmitting member, for example a slide, movable or shiftable from engaging relation with one carrier rod directly to engaging relation with another by means of suitable mechanism, such as a cam controlled rocker arm directly and positively operable by a cam, or other contact wheel structure, when a cam contact member is determinedly positioned for engagement with the cam by pattern controlled means in properly timed relationship with the other knitting machine elements.

In one embodiment of the invention, the shiftable slide or movement transmitting member is adapted to selectively connect either of two yarn carrier rods to the friction box as determined by a single control station which is suitably located, as at one side of a knitting section.

In another embodiment, the shiftable slide or movement transmitting member is adapted to selectively connect at least three yarn carrier rods to the friction rod as determined by either one or a plurality of control stations which are suitably located, along a knitting section.

Another feature of my invention resides in providing means for moving the friction box slide, or carrier engaging member, so that it travels continuously in one direction from a position of engagement with one carrier rod to a position of engagement with another carrier rod, in other words, from one actuating position directly to a second actuating position; and I accomplish this irrespective of whether the thread carrier dogs which the friction box slide engages are located at one or a plurality of control stations.

With these and other objects in mind, my invention also includes the novel elements, features of construction, and arrangement of parts in cooperative relationship as exemplified by the several practical embodiments hereinafter specifically described and shown by the accompanying drawings, in which:

Figure 3 is a fragmentary side elevation, partly in section, of the friction box and shiftable slide for selectively connecting carrier rods to the friction rod and the cam controlled mechanism for operating the slide;

Figure 4 is a fragmentary sectional view illustrating the manner of guiding and holding the slide in the friction box;

Figure 5 is a fragmentary view showing details of the hand operated lever seen in Figure 4;

Figure 1:
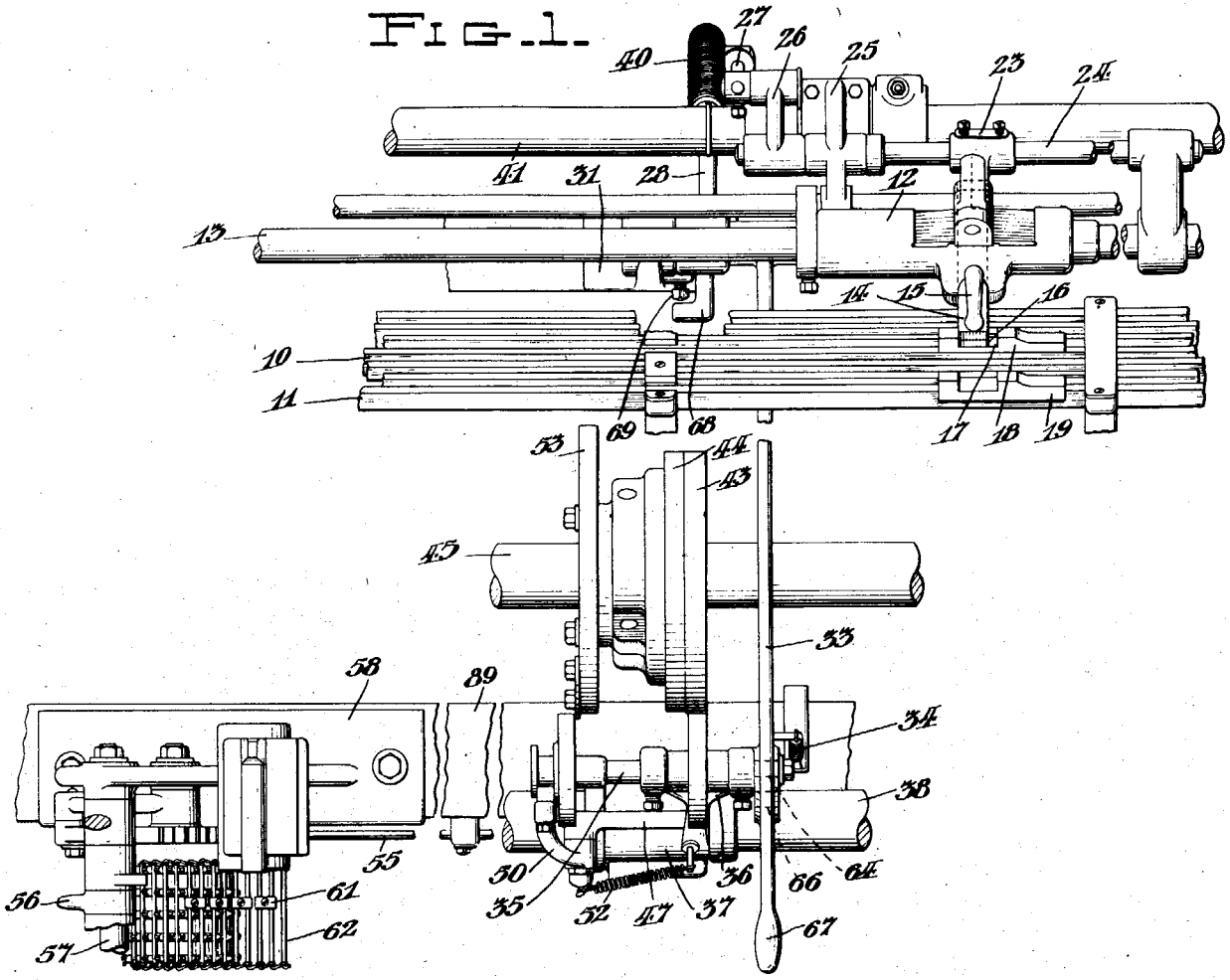
Figure 1 is a plan view, partly broken away, of the friction rod and carrier rods of a full fashioned knitting machine and automatic control mechanism therefor in accordance with one form of my invention.
Figure 2:
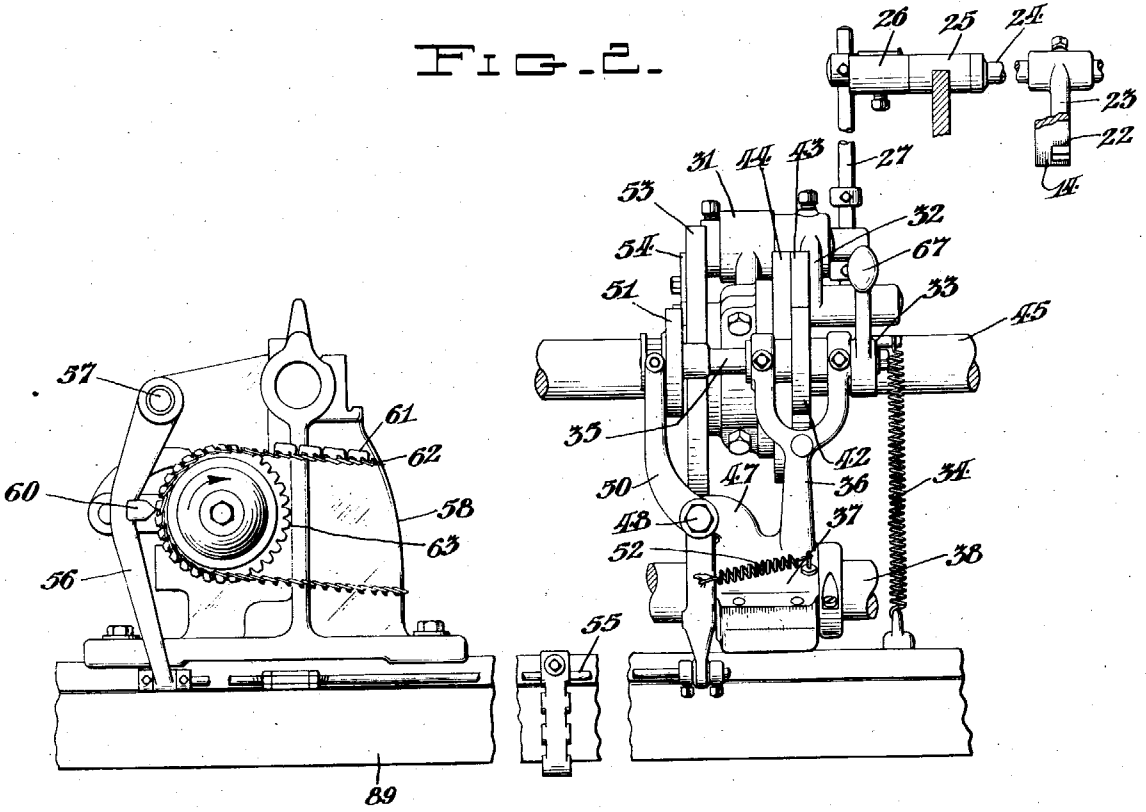
Figure 2 is a front elevation, partly broken away, of portions of the mechanism shown in Figure 1.
Figure 6:
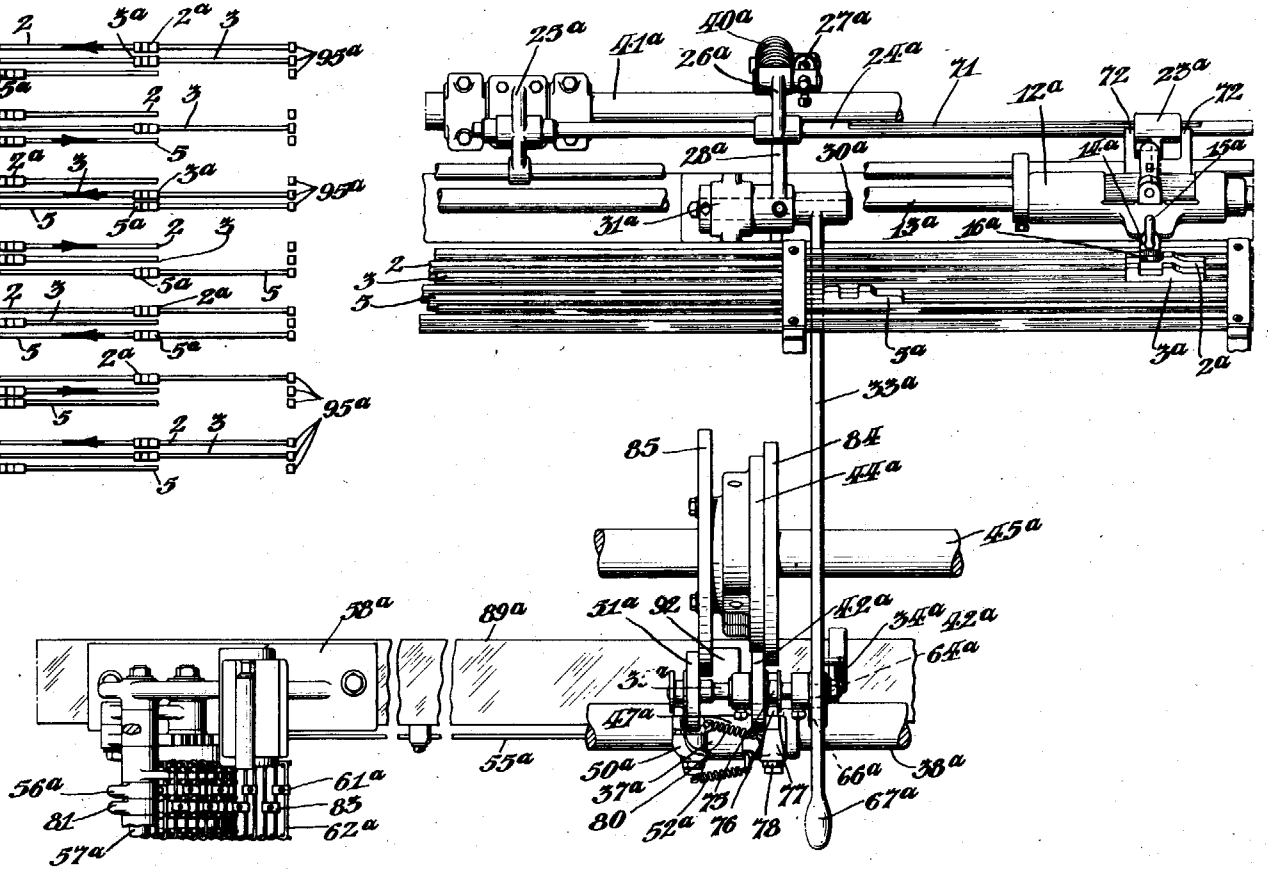
Figure 6 is a plan view, partly broken away, of the friction rod and carrier rods showing a modified form of automatic control mechanism therefor.
Figure 7:
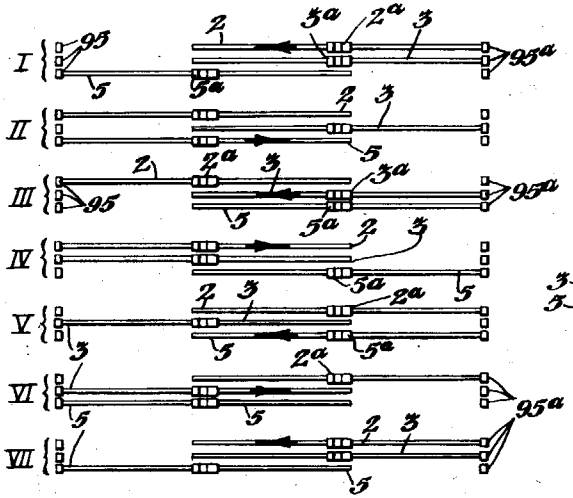
Figure 14:
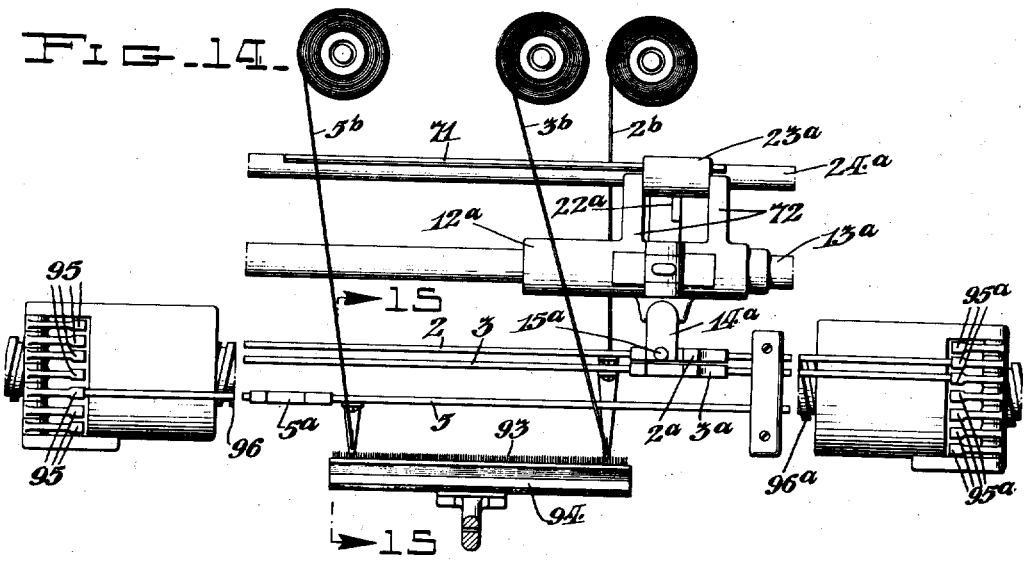
Figure 15:
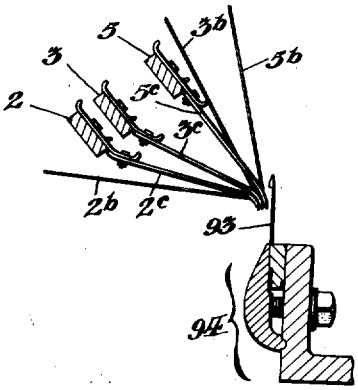
Figure 16:
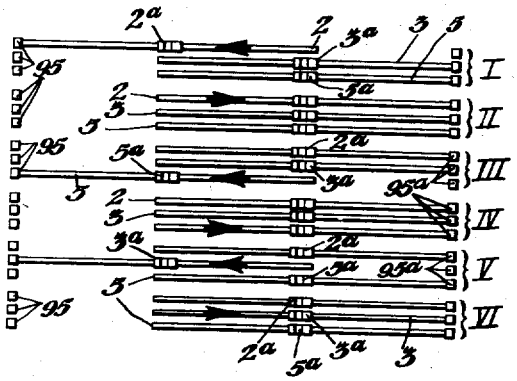
Figure 17:
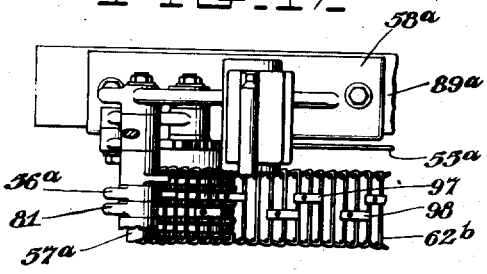

Figure 7 diagrammatically illustrates the movements of the yarn carriers when employing the control device of Figure 6;

Figure 8 is a front elevation, partly broken away, of portions of the mechanism shown in Figure 6;

Figures 9, 10 and 11 diagrammatically illustrate various operating positions of certain of the cam elements embodied in the mechanism of Figure 6;

Figure 12 is a fragmentary side elevation, partly in section, of the cam controlled mechanism of Figure 6 for operating the friction box slide;

Figure 13 is a view, partly in section, showing details of the lever structure for actuating the friction box slide of Figure 12;

Figure 14 is a diagrammatic plan view of certain parts involved in laying three yarns alternately in succeeding courses of the fabric during the knitting thereof;

Figure 15 is an enlarged sectional view, taken along the line 15—15 of Figure 14, showing details of the yarn carriers;

Figure 16 diagrammatically illustrates the movements of the yarn carriers in accordance with another method of operation of the automatic control mechanism of Figure 6; and Figure 17 is a fragmentary view of the pattern chain structure of Figure 6, showing an arrangement of buttons adapted to actuate the carrier rods in the manner illustrated in Figure 16.

As mentioned above, the inventions of the present application form a continuation-in-part of those disclosed in my referred to pending application; the present subject matter being correlated and coextensive therewith.

In view of the interrelation of inventions involved, the disclosure herein necessarily includes the subject matter of the earlier application; and this phase of the invention will be described first in order to facilitate an understanding of the entire inventive concept.

Referring to Figures 1 to 5 of the drawings, the numerals 10 and 11 designate two of a plurality of reciprocable thread-carrier rods adapted to lay yarn along the needles of a knitting machine for the formation of loops by the sinkers and dividers thereof. These carrier rods are reciprocated when connected to a friction box 12 carried by a reciprocable friction rod 13. In accordance with my invention, a slide 14 is guided in the friction box 12 for movement transversely of the carrier rods and is provided with a handle 15. Slide 14 has a nose 16 adapted to engage notches or recesses 17 in dogs 18 and 19 secured to the thread carrier rods. At its under side the slide 14 is provided, as shown in Figure 4, with a series of notches 20 engageable by a spring pressed ball 21, or other detent, to maintain the slide in the position to which it has been moved in friction box 12 for connecting a carrier rod to the friction rod 13.

The slide 14 is automatically moved in friction box 12 to selectively connect either of the thread carrier rods 10 or 11 to the friction rod 13 in the following manner: Near its rearward end slide 14 has a slot 22 normally receiving an arm 23 secured to a rock shaft 24 journaled in brackets 25. An arm 26 fixed to shaft 24 is adjustably secured to a rod 27 having collars 29 and 29′ engageable by the end of the arm 28 of a bell crank secured to a stub shaft 30 mounted in a bracket 31 on the frame of the machine. The other arm 32 of the bell crank is connected to a lever 33 held by a spring 34 in operative engagement with a stub shaft 35. Shaft 35 is journaled in a forked arm 36 extending from a collar 37 on loop regulating shaft 38. A spring 40 connected to bell crank arm 28 and a shaft 41 acts to maintain a roller 42 mounted on stub shaft 35 between the bifurcations of arm 36 in contact with a cam 43 or an idler cam 44 carried by a cam shaft 45.

A lug 47 on collar 37 supports a stud 48 on which a lever 50 is pivotally mounted. At its upper end lever 50 engages a sleeve secured to a roller 51 slidably mounted on shaft 35. A spring 52 connected to collar 37 and the lower arm of lever 50 normally acts on lever 50 to maintain roller 51 out of the plane of a cam 53 fixed to cam shaft 45. Cam 53 has secured to one side edge thereof a plate 54 a portion of which projects beyond the periphery of the cam. Plate 54 is adapted to cooperate with roller 51 for a purpose which will be described hereafter.

Lever 50 is connected by a rod 55 to an arm 56 pivotally mounted on a shaft 57 carried by a bracket 58. Arm 56 has a lug 60 positioned to be engaged by buttons 61 on a pattern chain 62 passing over a sprocket 63. Sprocket 63 is intermittently operated by being given a definite increment of movement for each rotation of cam shaft 45, this increment being sufficient for example to advance chain 62 one or more links.

Normally the nose 16 of slide 14 is received in the notch 17 of the dog 18 on carrier rod 10 so that the latter is connected to friction rod 13 through slide 14 and friction box 12. When friction rod 13 is reciprocated in well known manner the carrier rod 10 is moved thereby to lay yarn along the needles. As the friction rod and carrier rod move to the left (Figure 2) the slot 22 in slide 14 mounted in friction box 12 moves from engagement with arm 23 and on return movement of the rods to the right the slide is returned to normal position with the arm 23 seated in slot 22. As these movements of the friction and carrier rods take place, the end of arm 28 moves idly between the collars 29 and 29′ on rod 27, arm 28 being moved in one direction by spring 40 and in the opposite direction by the eccentric portion of cam 43 as the latter rotates in engagement with roller 42. Thus, arm 28 does not cause movement of rod 27 unless arm 23 is displaced from its adjusted position. In such event the operation of arm 28 acts to properly position arm 23 so that it may enter the slot 22 in slide 14 when the latter is returned with friction box 12 to normal position. Thus, a connection is re-established between slide 14 and arm 22 so that the slide may be moved in the friction box to establish connection with the carrier rod 11 if desired.

When another yarn, either of the same or of a different color, gauge or other characteristic with respect to that laid by carrier rod 10, is to be laid in a succeeding course or courses to obtain any desired separate yarn pattern or effect, a button 61 is mounted on pattern chain 62 in such position that the intermittent operation thereof brings the button beneath the lug 60 of arm 56 at the proper time for inserting the yarn supplied by carrier rod 11. Button 61 on being moved beneath lug 60 acts to pivot arm 56 on shaft 57 and through the rod 55 to turn lever 50 on stud 48 against the action of spring 52. This turning of lever 50 results in moving roller 51 on shaft 35 into the plane of cam 53. At this time the eccentric portion of cam 43 acts on roller 42 and arm 36 to maintain roller 51 slightly away from cam 53 to permit such axial movement of roller 51. As cam 53 rotates the periphery thereof, which has portions extending beyond the periphery of cams 43 and 44, engages roller 51 and acts to rock arm 36 clockwise and move roller 42 from contact with cam 43. The rocking of arm 36 causes counterclockwise rotation of arm 28 which being in engagement with collar 29 acts through rod 27 to turn shaft 24 and rock arm 23 counterclockwise. Arm 23 moves slide 14 in friction box 12 transversely of the carrier rods carrying the nose of slide 14 from the notch in the dog on carrier rod 10 into the notch of dog 19 on carrier rod 11.

Thus, the connection of carrier rod 10 to friction box 12 and friction rod 13 is interrupted and carrier rod 11 is connected to the friction box for reciprocation by friction rod 13. Consequently, on reciprocation of the friction rod in well known manner the next two courses laid along the needles will be of the yarn supplied by carrier rod 11. During the normal knitting operations the reciprocation of friction rod 13 moves the slide 14 away from arm 23 temporarily interrupting the connection between the slide and the arm. Slide 14 is held in its advanced position in friction box 12 by ball 21 engaging a notch 20.

Near the end of a revolution of cam 53 with shaft 45 the contour of the cam permits spring 40 to act to move the end of bell crank 28 away from collar 29 towards collar 29′ but not into engagement therewith. Since rod 27 is not operated the arm 23 remains in its advanced position for entering seat 22 when slide 14 is returned. As the low spot of cam 53 is presented to roller 51 the high spot or eccentric portion of cam 43 engages roller 42 rocking arm 36 to move roller 51 away from cam 53. Spring 52 tends to act on lever 50 and move roller 51 from the plane of cam 53 but is resisted by the connection of lever 50 to arm 56 which is held against movement by the button 61 seated beneath lug 60. Chain 62 may be provided with one or more buttons 61, for controlling the connection of carrier rod 11 to friction rod 13, depending on the ratio of movement of chain 62 to that of cam shaft 45. In any event a button, or buttons, on chain 62 acts on arm 56 and its connection to lever 50 to maintain roller 51 in the path of cam 53 for at least two revolutions of cam shaft 45; that is, for the cycle of operation in which carrier rod 11 reciprocates to lay two courses, one in each direction, during which slide 14 moves away from arm 23 and returns to connected relation therewith.

In the second revolution of cam shaft 45, cam 53 again acts on roller 51 and arm 36 to move roller 42 from contact with cam 43 and again moves arm 28 to engagement with collar 29 on rod 27 but does not cause movement of rod 27 on arm 23. As cam 53 completes its second revolution the reengagement of cam 43 with roller 42 moves roller 51 away from cam 53 so that spring 52 may pivot lever 50 on stud 48 moving roller 51 on stub shaft 35 from the plane of cam 53. Spring 52 may perform this function inasmuch as the controlling button 61 on chain 62 has been moved from engagement with lug 60 on arm 56.

Arm 23 is still in its advanced position and the slide 14 has returned to its normal position in which arm 23 is seated in the slot 22 of slide 14 reconnecting the latter to arm 23. As the low spot of cam 43 rides beneath roller 42 spring 40 acts to move bell crank arm 28 into engagement with collar 29′ moving rod 27 to rock shaft 24. As shaft 24 is rocked the arm 23 is turned clockwise and being again connected to slide 14 moves the latter in friction box 12 to withdraw nose 16 from engagement in the notch of the dog 19 on carrier rod 11 into engagement with the notch of the dog 18 on carrier rod 10. Thus, carrier rod 11 is disconnected from friction rod 13 and carrier rod 10 is again connected thereto for laying the yarn supplied by rod 10.

Thereafter the carrier rod 10 is reciprocated in the knitting operations and cam 43 and spring 40 cause movement of the end of bell crank arm 28 between collars 29 and 29′ without actuating rod 27 until another button, or other buttons, 61 on chain 62 advance to control the shifting of slide 14, as described above. By properly spacing the buttons 61 on chain 62, any desired separate yarn pattern or effect may be obtained, for example, a number of buttons may be mounted in succession on the chain to produce a plurality of successive pairs of courses of the yarn supplied by carrier rod 11, or the buttons may be omitted to produce successive pairs of courses of the yarn supplied by carrier rod 10, or the buttons may be spaced from each other thereby to alternate the respective yarns fed by the carrier rods 10 and 11 in predetermined order in preselected courses of the fabric.

In the knitting of full fashioned hosiery it is customary to perform narrowing operations at certain times. This is customarily effected by shifting cam shaft 45 axially to move the usual loop regulating cams out of operating position and to move narrowing cams into operating position. In the event that cam shaft 45 is shifted axially to the right (Figures 1 and 2) for a narrowing operation at the time a button on chain 62 has caused roller 51 to be moved into the plane of cam 53, the plate 54 on cam 53 acts to maintain roller 51 alined with cam 53 as the cam moves to the right with shaft 45. Plate 54 is secured to cam 53 in such position as not to interfere with the axial shifting of roller 51 when lever 50 is operated. When shaft 45 is shifted axially cam 43 moves from alinement with roller 42 and idler cam 44 moves into alinement therewith. Cam 53 also moves with shaft 45, and plate 54 being secured to the cam, the portion of this plate projecting radially beyond the periphery of the cam, after axial movement of the roller 51 by lever 50, will be positioned to engage the side of roller 51 and to move the latter along with cam 53 as cam shaft 45 moves to the right. After this action, continued rotation of the cam shaft 45 disengages plate 54 from the side of roller 51, and the latter, being held in engagement with the periphery of the cam by the relatively powerful spring 40, is thus held in alignment with the cam against the action of the smaller spring 52. The movement of slide 14 effected by cam 53 during the narrowing operation connects carrier rod 11 to friction rod 13 for reciprocation thereby on termination of the narrowing operation. When the narrowing operation is terminated shaft 45 is shifted to the left (Figures 1 and 2) the roller 51 on lever 50 is positioned in the plane of cam 53, the roller being moved with cam 53 by spring 52 as shaft 45 shifts axially. Thus, cam 53 is effective to cause connection of carrier rod 11 to friction box 12 for laying separate yarns of similar or contrasting color or gauge in succeeding courses respectively of the fabric as described above when friction rod 13 is reciprocated after the narrowing operation.

Lever 33 has a notch 64 normally in engagement with stub shaft 35 for connecting levers 33 and 36. A slot 65 in lever 33 connects notch 64 with a second notch 66 also adapted to engage stub shaft 35. Lever 33 has a handle 67 by which it may be raised to disengage notch 64 from stub shaft 35 and moved rearwardly to engage the notch 66 with stub shaft 35. Such movement of lever 33 turns bell crank arm 32 clockwise causing a stop 68 associated therewith to engage a set screw 69 on bracket 31 for limiting the rearward movement of lever 33. Bell crank arm 28 is also turned clockwise positioning its end adjacent collar 29′ so that bell crank arm 28 on operation by cams 43, 53 or spring 40 moves idly between collars 29' and 29 without moving connecting rod 27. As a result arm 23 and slide 14 remain positioned to connect a desired carrier rod, such as 10, to friction rod 13 and are not operated during rotation of cam shaft 45 to connect another carrier rod, such as 11, to the friction rod.

It is to be understood that slide 14 may be employed in conjunction with various pairs of carrier rods other than rods 10 and 11, since the invention resides in the novel mechanism disclosed for automatically actuating selected yarn carriers in predetermined order in succeeding courses of the fabric, the mechanism functioning in the manner described irrespective of the type or purpose of the respective yarns fed thereby. For example, slide 14 may normally connect the carrier rod to the left of rod 10 to friction rod 13 and on movement, as described above, may connect the carrier rod to the left of rod 11 to friction rod 13. This may be effected by adjusting the connection of arm 26 to rod 27 so that shaft 24 and arm 23 are positioned to normally locate the nose 16 in the notch of the dog carried by the carrier rod to the left of rod 10. On operation of rod 27 by cam 53 the movement of slide 14 would then connect the carrier rod to the left of rod 11 to friction rod 13. Similar adjustments of shaft 24 and arm 23 may be made by moving rod 27 rotatively to arm 28 and relocating the collars 29 and 29' correspondingly.

The extent of movement of slide 14 may be varied by positioning the collar 29 to provide for an idle movement of arm 28 before it engages the collar for moving rod 27 and arm 23. In this manner the spacing of the carrier rods between which the nose 16 of slide 14 moves may be varied.

In the foregoing arrangement it is to be particularly noted that my device differs from prior art devices in that during the shifting or carrier changing operation the friction box slide or carrier engaging member travels continuously in one direction from a position of engagement with one carrier rod to a position of engagement with another carrier rod, i. e., it moves from one actuating position directly to a second actuating position, and is not required to be moved to a neutral position upon disengagement from a carrier rod and then returned to a position of engagement with another selected rod, as in prior art devices, so that there is no lost motion present during the shifting operation.

Attention is directed to the fact that the device above described constitutes a selective carrier actuating device provided with one carrier engaging, or control, station and embodying certain novel elements and arrangement of parts in cooperative relationship.

Realizing that such a device having a single carrier control station is not entirely adequate to serve certain purposes, particularly where a more universal selective control of the carriers is desirable, I have also made provision to extend its usefulness by utilizing this same mechanism and adding thereto a second carrier control station thereby adapting it for various other purposes requiring one or more carrier selecting stations. To accomplish this I provide, as more particularly illustrated in Figures 6 to 15, another embodiment of the invention in which the friction box slide 14a is adapted to selectively connect at least three thread carrier rods to the friction rod, the slide being actuable at either one or two control stations, shown in this instance at opposite sides of the knitting section. The various parts and mechanisms of this embodiment corresponding to those of the embodiment illustrated in Figures 1 to 5 are identified by like reference numerals with the superscript *a* added thereto.

Referring particularly to Figures 6, 12 and 13, the arm 23a is slidably mounted on rock shaft 24a which has a spline 71 thereon coacting with a keyway 71a (Figure 13) in the arm 23a, whereby rotary or oscillatory movements of the rock shaft will impart corresponding movements to the arm and thus variably position the friction box slide 14a controlled thereby. The nose 16a of the slide is adapted to selectively engage notches in dogs 2a, 3a or 5a on thread carrier rods 2, 3 and 5, respectively, so that any one of these rods may be connected at will to the friction rod 13a for laying the yarn fed by such rod in any desired course or courses. The friction box 12a has two arms 72, 72 extending therefrom which embrace the arm 23a and cause the latter to slide along the splined shaft in unison with the friction box as it is reciprocated across the knitting field. As shown in Figure 13, the arms 72 have openings 73 therein to provide clearance for the usual friction box guide rod 74a. The rock shaft 24a is oscillatable to three positions to selectively connect the carrier rods 2, 3 and 5 to the friction rod for reciprocation thereby, the rock shaft being actuated to its various operating positions by the lever system 26a—36a generally in the manner hereinbefore set forth in describing the mechanism of Figures 1 to 5, except that the contours of the cams 43 and 53 shown in these figures are changed to vary the throw of the friction box slide.

In order that the lever system and hence the slide 14a may be actuated to three operating positions, the roller 42a, Figure 6, has extending therefrom a flanged sleeve 75 engageable by a tongue 76 secured to and movable with lever 77 pivotally mounted on a stud 78 extending from lever 36a, the last named lever being freely rotatable on shaft 38a but prevented from longitudinal movement thereon by split collars 90 and 90a clamped to shaft 38a. The lower end of the lever 77 is connected by means of a rod 79 to an arm 81 copivotally mounted at 57a with the lever 56a, the arm 81 having a lug 82 adapted to contact with a second row of buttons 83 mounted on the pattern chain 62a. The lever 77 is normally biased by means of a spring 80 in the position shown, and therefore when no button in the row of buttons 83 is in position to contact with lug 82, the roller 42a is in contact with the round cam 44a and the position of the lever system 26a—36a, rock shaft 24a and arm 23a will cause nose 16a of the slide 14a to engage a dog on one of the thread carrier rods, for example No. 2, and thereby connect said yarn carrier with the friction rod for reciprocation thereby. When a button in the row of buttons 83 on the pattern chain is operatively positioned beneath lug 82, however the lever 77 will be rotated (in a clockwise direction as viewed in Figure 8) so that at the proper time the roller 42a will shift to the right, as viewed on Figures 6 and 8, into the plane of cam 84 on cam shaft 45a for camming engagement therewith as shown in Figure 10. Cam 84 is higher than the round cam 44a and actuates the lever system 26a—36a so as to rotate shaft 24a and arm 23a to cause the nose 16a of the friction box slide to disengage from lug 2a and engage lug 3a thereby to connect thread carrier 3 with the friction rod. If desired, the collar 29a of said lever system 26a—36a may be adjusted to the position indicated by dot-and-dash lines in Figure 12 thereby to provide a positive connection between rod 27a and arm 28a of the system.

When a button in the row of buttons 61a on the pattern chain is moved beneath lug 60a on arm 56a, this causes the roller 51a to be shifted into the plane of a cam 85 for camming engagement therewith as shown in Figure 9. This cam is larger than either cam 44a or cam 84 so that cam 85 is controlling and shifts the lever system 26a—36a to rotate shaft 24a and arm 23a to cause the nose 16a of the friction box slide to disengage from carrier 2 or carrier 3, as the case may be, and engage the dog 5a of carrier rod 5 to connect the latter with the friction rod for laying the yarn fed by this carrier. The buttons 61a and 83 may be mounted on the pattern chain in any desired spaced relation and thereby enable the three carriers to be actuated in any desired predetermined order in succeeding courses of the fabric during the knitting thereof.

Referring particularly to Figures 6 and 8, movement of the operating rods 55a and 79 to the left, as viewed in the figures, is effected (against the tension of springs 86 and 87 respectively positioned on the rods by means of collars 99, 99a and 100, 100a clamped to the rods) when the arms 56a and 81 associated therewith are rotated by means of buttons 61a or 83 beneath the lugs 60a and 82, respectively. This movement of the operating rods results in compression of the spring 86 or 87, as the case may be, the action of the spring causing the roller 42a or 51a with which it is associated to bear against the side of cam 84 or 85, so that when the shifting point *x*, Figure 12, of the cams has reached the proper position the roller will be automatically shifted by the action of its spring at the proper time into engagement with the cam 84 or 85. With this arrangement the timing of the cams 84 and 85 may be changed to cause the roller shifting operation and movement of the friction box slide to take place at any desired point or points in the path of travel of the friction box so that the yarn fed by a selected carrier may be laid the full length of a course in the fabric or laid for a part of a course only, as desired, the roller shifting mechanism per se comprising the subject matter of a separate application.

A stop comprising a threaded stud 88, Figure 12, is tapped into the front rail 89a of the machine frame; the stud has a lock nut 91 for locking the stud at any desired height relative to an abutment or stop arm 92 secured to and extending from the collar 37a of lever 36a for preventing the roller 42a from dropping off the round cam 44a when cam shaft 45a is longitudinally shifted by the chain motion mechanism to the narrowing position, shown in Figure 11. In accordance with the usual operation of the pattern chain, a selecting movement of the levers 56a and 81 may occur during the narrowing operation which shifts a selected follower to the right as viewed in Fig. 11. Upon the cam shaft returning to a position for normal knitting, the selected follower yieldingly engages the side of the corresponding cam, and thereafter automatically aligns itself with said cam when the portion *x* of said cam coincides with said follower, as previously explained. For the sake of simplicity only those parts of the chain motion mechanism necessary to an understanding of the invention are shown; the various other parts and their method of operating for shifting the cam shaft are well known in the art and are shown and described in detail in the "Reading" Full Fashioned Knitting Machine Catalogue (copyright 1929) published by the Textile Machine Works, Reading, Pennsylvania.

By staggering the buttons in the rows 61a and 83, as shown in Figure 6, the friction box slide may be disengaged from or engaged with any desired carrier at either or both sides of the knitting section, thus providing two control stations, and therefore a single course of any one of the yarns fed by the carriers may be produced without the necessity of using an idle course motion to return the friction box to the opposite side of the section to engage the next carrier.

Figures 7, 14 and 15 diagrammatically illustrate the operation of the mechanism in knitting a stocking blank by utilizing three main yarn carriers for laying separate yarns in successive courses I to VII of the fabric. In course I, one of the thread carrier rods, for example No. 2 carrier, is engaged by the friction box slide and is caused to traverse the knitting field from right to left and lay the yarn supplied by it to form a course of the fabric, while Nos. 3 and 5 carriers are waiting at the right and left sides, respectively, of the knitting section. After the loops of course I have been formed and before laying the yarn for the next succeeding course II, the roller 51a is shifted, by means of a button 61a on the pattern chain, into camming engagement with the cam 85, Figure 9, so that the friction box slide is disengaged from carrier No. 2 and directly moved into engagement with carrier No. 5 in order that this carrier may lay the yarn from left to right in course II while Nos. 2 and 3 carriers remain at opposite sides, respectively, of the knitting section. After the loops of course II have been formed and before the yarn is laid for the next succeeding course III, the roller 42a is shifted, by means of a button 83 on the pattern chain, into camming engagement with the cam 84, Figure 10, to thereby disconnect the friction box slide from carrier 5 and directly move the same into engagement with No. 3 carrier, thus causing this carrier to lay the yarn from right to left for the course III, Nos. 2 and 5 carriers remaining at opposite sides of the knitting section at this time. In the succeeding courses IV, V and V′, the carrier rods are actuated in the same order, each of the carriers travelling in a direction opposite that in the preceding three courses in laying the yarn, and prior to laying the yarn for course VII there has been a complete cycle of operation of the three carriers in the order stated.

Figures 14 and 15 illustrate one method of bringing the yarn carriers 2c, 3c and 5c for laying the yarn across the needles 93 of the knitting section shown so as to minimize the possibility of the yarns becoming entangled or broken during alternate reciprocations of the yarn carriers, although it will be understood that any other suitable method of preventing entanglement or rupture of the yarns may be employed. It is to be understood that the needle bar 94 is given the necessary vertical and horizontal movements by the usual needle bar actuating mechanism, and that the end stops 95 and 95a are of the usual type controlled by screw threaded spindles 96 and 96a at opposite ends of the knitting machine for determining the traverse of the various thread carrier bars (only three of which are shown).

Figure 16 diagrammatically shows another method of alternating the yarns which may be carried out by the mechanism hereinbefore described, Figure 17 showing the arrangement of buttons on the pattern chain 62b for producing this action. In this case rows 97 and 98 of double buttons are employed each of which is operative in two courses of the fabric so that, as indicated in Figure 16, three separate yarns are employed to form the body yarn of the stocking fabric with the respective carriers 2, 3 and 5 starting from a single station, or from the same side of the knitting section. As shown, the yarn in the first two courses I and II is laid by No. 2 carrier; in the next succeeding two courses III and IV the yarn is laid by No. 5 carrier; and in the next succeeding two courses V and VI the yarn is laid by No. 3 carrier, this cycle of operation of the carriers being repeated throughout any desired length of the fabric.

It is to be understood that the friction box slide may be employed for engagement with any of the carrier rods, other than Nos. 2, 3 and 5, and in any desired order as determined by the pattern mechanism, for automatically actuating selected yarn carriers in predetermined order in succeeding courses of the fabric, regardless of the type or purpose of the respective yarns fed thereby. As in the first form shown, the friction box slide or carrier engaging member travels continuously in one direction, during the shifting or carrier changing operation, from a position of engagement with one carrier rod directly to a position of engagement with either of the other carrier rods, and therefore there is no lost motion present during the shifting operation.

It will also be noted that in the foregoing forms of the invention illustrated in the drawings the friction box slide 14 or 14a is positioned and movable in a plane parallel to the plane of the bank of coacting thread carrier rods 10, 14 etc. or 2, 3, 5 etc. With this arrangement the dogs 17, 19 and 2a, 3a, 5a, respectively, on the thread carrier rods with which the slide engages may all be made alike so that one form and size only is required for all carriers; since the dogs are relatively small and do not extend any considerable distance from the thread carrier rods, substantially no leverage action is developed by reason of the height of the dogs and therefore no additional strain is imposed upon either the friction box slide or the dog engaged thereby.

Of course, the improvements specifically shown and described, by which I obtain the above results, can be changed and modified in various ways without departing from the scope of the invention herein disclosed and hereinafter claimed.

I claim:

1. In a straight knitting machine, the combination with a plurality of thread carrier rods respectively feeding separate yarns to the same knitting section, a friction rod, a friction box on said rod having a slide movable transversely across the thread carrier rods for selective engagement therewith, and a rotatable cam shaft; of a rock shaft having an arm slidably mounted thereon and rotatable therewith, said arm engaging said friction box slide for controlling the position thereof relative to the thread carrier rods, a plurality of cams rotating in correspondence with said cam shaft, cam follower means for said cams operatively connected with said rock shaft for rotating the shaft to actuate the friction box slide to different operative positions, said cams determining the throw of said friction box slide thereby to determine which of said carrier rods shall be engaged by the slide, and pattern controlled mechanism for shifting said cam follower means into camming engagement with said cams in predetermined order in succeeding courses, respectively, of the fabric being knitted.

2. In a knitting machine, a reciprocable movement imparting member, a movement transmitting means adapted to selectively engage said movement imparting member with any one of a plurality of yarn carriers, of means effecting said selective engagement including an element normally contacting a movable means for one position of selection of the movement transmitting member, shiftable means for moving said element to a position of activity with another movable means for a second position of selection of the movement transmitting member, and an additional shiftable element adapted to be shifted into a position of activity with a third movable means and simultaneously render said other element inactive, for a third position of selection of the movement transmitting member.

3. In a full fashioned stocking blank knitting machine, the combination of a plurality of reciprocable yarn carriers, yarn carrier reciprocating means, a unit for connecting the yarn carriers to said reciprocating means for reciprocation thereby, a rotatable cam shaft axially shiftable to effect knitting in one position and narrowing in another position, means movable with and relative to said unit for selectively connecting one of said carriers to, and disconnecting another of the carriers from, the unit at either side of the knitting field to lay separate yarns in recurrent sequence, and actuating means including an element bodily reciprocably shiftable longitudinally of the machine independently of said unit to effect transmission of an actuating impulse to said selective connecting means, pattern control means, and means governed by said pattern control means and operative when the cam shaft is in either one of said positions for shifting said element into the position required for said sequential operation when the cam shaft is in knitting position, said actuating means and said last mentioned means arranged to prevent the transmission of an actuating impulse when said cam shaft is in narrowing position and to automatically bring said element into impulse transmitting position upon return of said cam shaft to knitting position.

4. In a straight knitting machine the combination with a plurality of thread carrier rods respectively feeding separate yarns to the same knitting section, a friction box for reciprocating said carrier rods, a movement transmitting member on said friction box adapted to selectively engage said movement imparting member with any of said carrier rods, and a rotatable cam shaft axially shiftable to effect knitting in one position and narrowing in another position; of a device for causing said movement transmitting member to automatically engage and reciprocate said thread carrier rods in predetermined order in sequentially succeeding courses of the fabric during knitting thereof, said device comprising three cams on said cam shaft and cam follower means for said cams connected with said movement transmitting member for positioning the same relative to said carrier rods, said follower means comprising a shiftable spindle having two followers thereon one of which is axially fixed with respect to the spindle and the other of which is slidable with respect to the spindle, said spindle and followers arranged to provide three active positions of the cams and follower means when the cam shaft is in knitting position and to provide a neutral position of the cams and cam follower means when the cam shaft is in the narrowing position.

5. In a flat knitting machine in combination, a main cam shaft, a friction box having a bar movable transversely to the line of motion of the box for selectively connecting and disconnecting the box with a plurality of yarn carrier rods, means having a part movable with said box and arranged to shift said bar into engagement with one of said carrier rods whenever said part receives an actuating impulse from the cam shaft, and means controlled by the pattern mechanism of the machine for at times preventing said part from receiving an impulse from the cam shaft except at predetermined spaced strokes of said friction box and at other times causing said part to receive actuating impulses from the cam shaft at successive strokes of said friction box.

6. In a flat knitting machine in combination, a main cam shaft, a friction box having a slide bar movable transversely to the line of motion of the box for selectively connecting and disconnecting the box with a plurality of yarn carrier rods, means having a part movable with said box and arranged to shift said bar into engagement with one of said carrier rods whenever said part receives an actuating impulse from the cam shaft, and means controlled by the pattern mechanism of the machine for at times preventing said part from receiving an impulse except at predetermined spaced strokes of said friction box and at other times causing said part to receive actuating impulses from the cam shaft at successive strokes of said friction box.

7. In a flat knitting machine in combination, a main cam shaft, a friction box, a member movable transversely to the line of motion of the box for selectively connecting and disconnecting the box with a plurality of yarn carrier rods, means having a part movable with said box and arranged to shift said member into engagement with one of said carrier rods whenever said part receives an actuating impulse from the cam shaft, and means controlled by the pattern mechanism of the machine for at times preventing said part from receiving an impulse except at predetermined spaced strokes of said friction box and at other times causing said part to receive actuating impulses from the cam shaft at successive strokes of said friction box.

RUDOLPH ANKE.